Patented Apr. 24, 1934

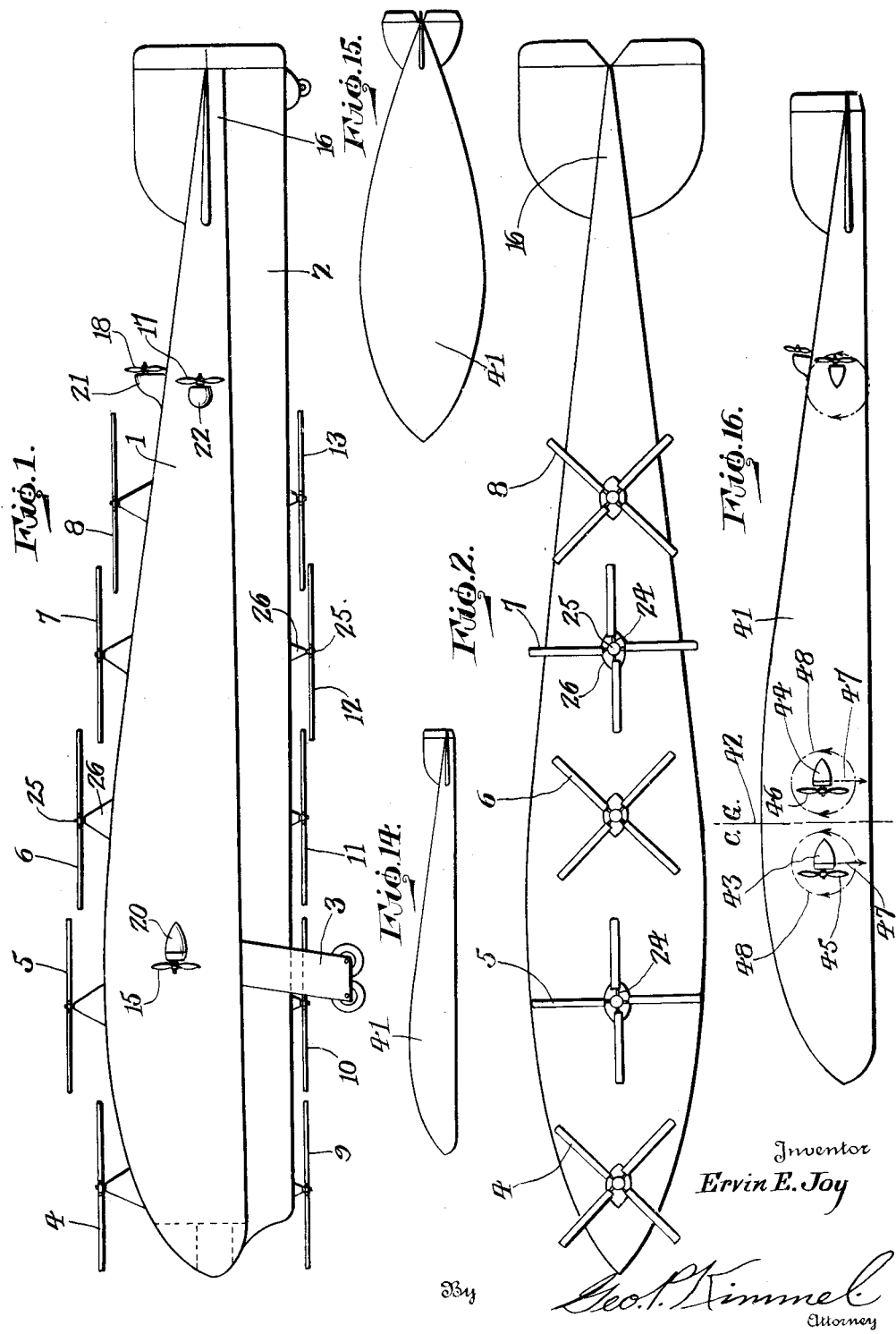

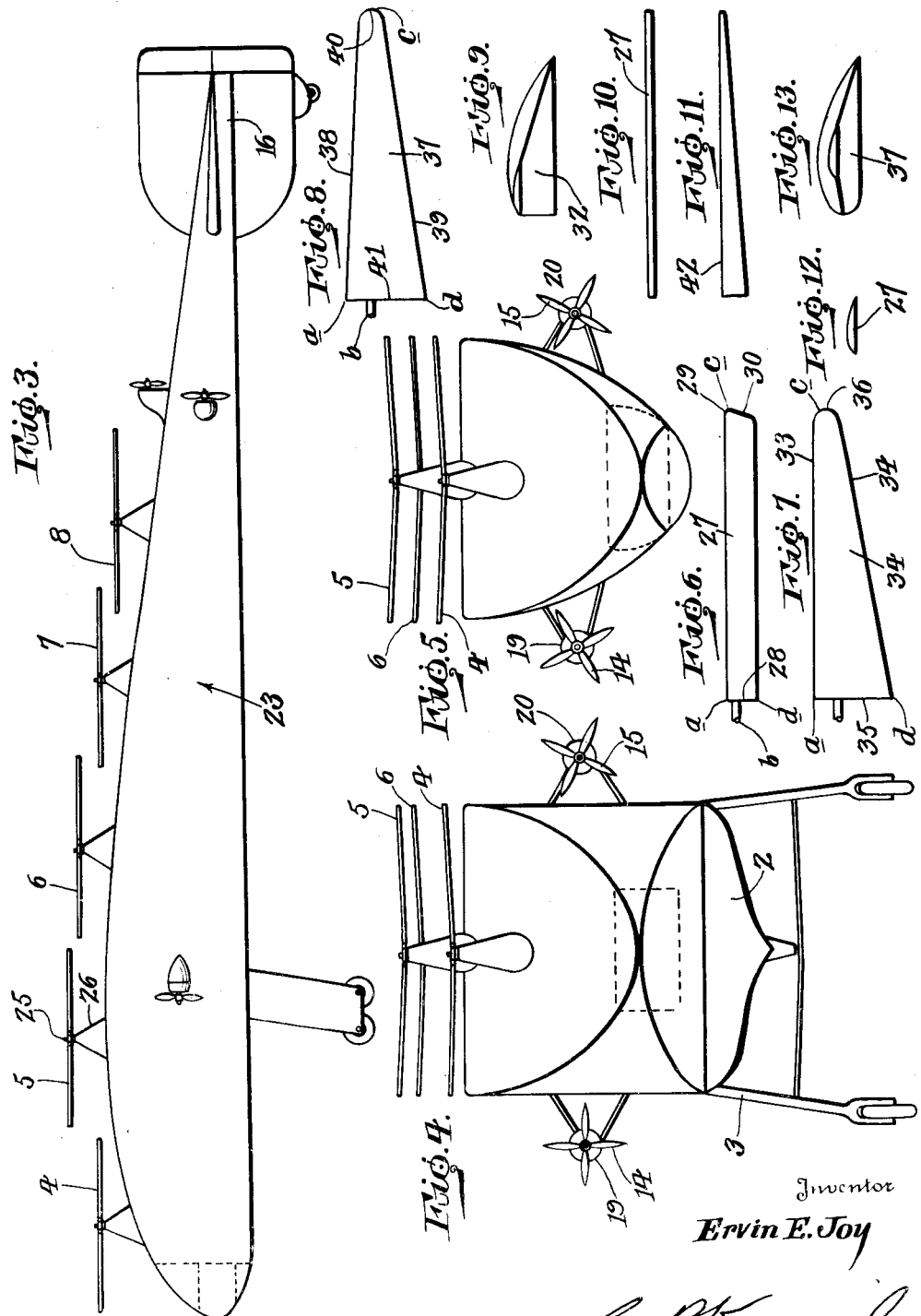

1,956,508

UNITED STATES PATENT OFFICE 1,956,508

NONDIRIGIBLE AIRCRAFT

Ervin E. Joy, Portland, Oreg.

Application June 10, 1933, Serial No. 675,301

14 Claims. (Cl. 244—14)

This invention relates to a non-dirigible aircraft.

The essential objects of the invention are to provide an aircraft with the omission of wings to reduce resistance to a minimum; an aircraft constructed in a manner to prevent wreckage thereof to a minimum when landing on water; an aircraft to overcome the carrying of ballast; an aircraft for maintaining an altitude desired; an aircraft for insuring safety when taking off and landing; an aircraft whereby its lifting power and carrying capacity is increased; an aircraft so constructed and arranged to obtain a greater elimination of unfavorable flying conditions; an aircraft insuring safe landing and navigating on water; an aircraft to permit of repairs while in flight; an aircraft having a positive control; an aircraft requiring a small crew; an aircraft capable of rising and landing in a shorter space than that required by the average aircraft; an aircraft capable of traveling over land and water; an aircraft to insure great safety; and to attain these ends in a strong, durable, compact, stable, thoroughly efficient, conveniently controlled and comparatively inexpensive structure.

To the above ends essentially and to others which may hereinafter appear, the invention consists of such parts, and such combination of parts which fall within the scope of the invention as claimed.

In the drawings:

Figure 1 is a side elevation of the aircraft constructed for traveling upon land and navigating on water.

Figure 2 is a top plan view thereof.

Figure 3 is a side elevation of the aircraft constructed to travel upon the ground.

Figure 4 is a view looking towards the front end of the form shown in Figure 1.

Figure 5 is a view similar to Figure 4 looking towards the front end of the form shown in Figure 3.

Figure 6 is a view illustrating one form of a lifting and sustaining member or vane showing the width of the latter and looking towards one side face thereof.

Figure 7 is a view showing a modified form of a lifting and sustaining member or vane looking towards one side face thereof.

Figure 8 is a view similar to Figures 6 and 7 of still another modified form of lifting or sustaining member or vane.

Figure 9 is an end view of the form shown in Figure 7.

Figure 10 is an edge view of the form shown in Figure 6.

Figure 11 is an edge view of the forms shown in Figures 7 and 8.

Figure 12 is an end view of the form shown in Figure 6.

Figure 13 is an end view of the form shown in Figure 8.

Figure 14 is a side view of the fuselage without the airvanes, boat hull and motors.

Figure 15 is a top plan view of the fuselage shown in Figure 14.

Figure 16 illustrates in side elevation a modified form.

The aircraft is driven by a series of propeller elements arranged exteriorly of the sides and top of the fuselage. The motors for driving such elements may be arranged within the fuselage and connected to the propellers by driving connections, or the motors may be supported from the fuselage exteriorly of the latter and have the propellers directly connected to the shafts thereof. By way of example, the driving motors for the propeller elements are shown as supported from and arranged exteriorly of the fuselage. The number of propeller elements and the driving motors therefor may be as desired, and preferably as shown by way of example, five in number. It is to be understood however that the propeller elements may be driven from any arrangement of driving means suitable for such purpose. The arrangement shown of the propeller elements and the driving means for the latter is that one or more motors are arranged on each side of the fuselage at the center of gravity, one or more motors on each side of the fuselage near the tail of the latter and one or more motors on the top of the fuselage near its tail. The propeller elements may be provided with rotary axes, thereby enabling them to give forward, backward, upward and downward action or thrust.

The craft is provided with revoluble sets of elevating and sustaining members or vanes arranged exteriorly thereof in any suitable manner for the purpose intended therefor and operated from driving means from within the fuselage. As stated, the sets of vanes may be arranged in any suitable manner with respect to the fuselage, but the preferred arrangement is as shown, which is substantially tandemwise and with certain of the sets of vanes arranged out of alignment with the others, as well as certain sets being positioned above other sets.

With reference to Figures 1, 2 and 4, the aircraft is shown as including a fuselage 1, a hull 2 depending from the latter, a landing carriage 3 of any suitable form, revoluble sets of pivoted elevating and sustaining members or vanes designated 4, 5, 6, 7, 8, 9, 10, 11, 12 and 13, a series of propeller elements, one indicated at 14 disposed on one side of the fuselage at the center of gravity, another indicated at 15 on the other side of the fuselage at the center of gravity, one on each side of the fuselage in proximity to the tail 16 and indicated at 17, only one of the elements being shown, and another indicated at 18 arranged upon the top of the fuselage in proximity to tail 17. Motors 19, 20, 21 and 22 supported from the fuselage are employed for driving the elements 14, 15, 17, 18, respectively. The elements 14, 15 are arranged forwardly or backwardly of the motors or driving mechanism 19, 20. The elements 17, 18 are arranged rearwardly of the motors 21, 22. The elements 14, 15 are positioned in alignment. The elements 17 are positioned in alignment. The element 18 is arranged between elements 17. The fuselage or body is constructed in an airfoil and together with the hull are of stream-line contour for reducing resistance. The motors are braced and supported by any suitable means from the fuselage.

With reference to the form shown in Figures 3 and 5 and generally indicated at 23, it is of the same construction as the form shown in Figure 1 with the omission of hull 2 and sets 9, 10, 11, 12 and 13 of the elevating and sustaining members or vanes omitted.

Each set of lifting and sustaining members or vanes consists of two or more blades, and as shown by way of example four, arranged in pairs, and with the blades of each pair being slightly offset with respect to each other in endwise opposed arrangement. The inner ends of the blades of a pair are arranged in spaced relation with respect to each other. The inner end of each blade has a stub shaft, extension or pivot 24 extended therefrom and which is arranged between the longitudinal center and top edge of the blade. The stub shafts 24 of each set are connected to a vertically disposed rotatable operating shaft 25 driven from the interior of the fuselage by any suitable means, not shown. A bracing and supporting structure 26 is provided for each shaft 25. Each blade of a set is inclined with respect to the axis of its stub shaft. The stub shafts 24 of a set are radially disposed with respect to that shaft 25 to which they are connected.

With respect to Figures 1 and 5, the sets of vanes 4, 5, 6, 7 and 8 are arranged over and in spaced relation with respect to the top of the fuselage. The shafts 25 of said sets are disposed at the lengthwise center of said top. The set 4 is arranged below set 5, the latter above set 6, the latter above set 7 and the latter above set 8. The sets 4, 5, 6, 7 and 8 are arranged substantially in a tandemwise manner.

With reference to Figures 1 and 2, the sets of vanes 9, 10, 11, 12 and 13 are arranged below and spaced from the bottom of hull 2. The set 12 is positioned below sets 9, 10, 11 and 13. The shafts 25 of the sets 9, 10, 11, 12 and 13 are disposed at the keel or lengthwise center of the hull 2. The sets 9, 10, 11, 12 and 13 are arranged in vertical alignment with the sets 4, 5, 6, 7 and 8 respectively.

The vanes of the sets 4, 5, 6, 7 and 8 are disposed relative to their shafts 25 in the same manner as the vanes of the sets 9, 10, 11, 12 and 13, and in this connection, it will be noted that the vanes of the sets 4, 6, 8, 9, 11 and 13 are arranged differently with respect to the vanes of the sets 5, 7, 10 and 12. The vanes of the sets 10, 12 are arranged similar to the arrangement of the vanes of the sets 5, 7. The vanes of the sets 9, 11 and 12 are arranged similar to the vanes of the sets 4, 6 and 8. The vanes of the set 5 and the set 7 are disposed at zero, 90°, 180° and 270°, whereas the vanes of set 4, set 6 and set 8 are disposed at 45°, 135°, 225° and 315°.

Each vane of a set extends upwardly at an inclination from its inner to its outer and the vanes of the pair of vanes of each set extend upwardly at opposite inclinations to each other as shown in Figures 4 and 5. Each vane of each set as before stated is disposed at an inclination with respect to the axis of its stub shaft, extension or pivot 24.

One form of elevating and sustaining member or vane is shown in Figures 6 and 10 and indicated at 27 is of oblong contour formed with a squared inner end edge 28, a rounded upper outer end corner 29 and an outer end edge formed of an inwardly inclined part 30.

The form of elevating and sustaining member or vane shown in Figure 7 are indicated at 32 includes a straight side 33, an inclined side edge 34, a squared inner end edge 35 and a rounded outer end edge 36.

The form of elevating and sustaining member or vane shown in Figure 8 and indicated at 37 includes a pair of side edges 38, 39 inclining towards each other from their inner to their outer ends, a rounded outer end edge 40 and a squared inner end edge 41.

The forms of elevating and sustaining members or vanes shown in Figures 7 and 8 gradually decrease in thickness from their inner to their outer ends as shown in Figure 11. The reference character 42 has been applied to the vane shown in Figure 11.

There has been applied to Figures 6, 7 and 8 the letters $a, b, c, d$. The pivot point for each member or vane is indicated at $b$. The members or vanes are of the cantilever type to obtain efficient lifting capacity. The outer tip of each member or vane represented at $c$ travels faster than any point between $c$ and $a$ and $c$ and $d$. The cantilever type of elevating and sustaining members or vanes provides for a more uniform lifting power.

Referring to Figure 14 the fuselage indicated at 41 and which has eliminated therefrom the air or wind vanes, boat hull and motors. The fuselage 41 is shaped to provide an airfoil. The stream-line contour of fuselage 41 is shown in Figure 15.

In Figure 16 the fuselage 41 is provided on one side in closed proximity to and is positioned at each side of the center of gravity, indicated at 42 with a motor. The motors are indicated at 43, 44 and the propellers at 45, 46 respectively. The motors are mounted in a manner to be adjusted in the direction of the arrows 47, 48, 49. The motors and propellers 50 arranged at the rear of the fuselage are to be mounted in the same manner as the motors 45, 46. Mounting in the motors in the manner as stated the propellers may be set to obtain any direction of thrust desired. It is to be understood that on the other side of fuselage 41 a like arrangement of motors 45, 46 will be positioned.

Fuel is carried by the hull portion, leaving the fuselage for freight and passengers. When the hull is not used, the fuel and freight will be carried in the lower section of the fuselage. The vessel will be constructed from metal and fitted with ailerons, if necessary, to assure lateral balance. The ailerons will be placed at such points as will give the greatest efficiency. The elevating and sustaining members or vanes may be constructed in any suitable manner and covered by any kind of material. The number of landing gears may be as desired, depending upon the length, width and weight of the vessel.

What I claim is:—

1. An aircraft including a body structure, revoluble sets of combined elevating and sustaining vanes disposed throughout the top of said structure in spaced relation, and a series of propeller elements, one being disposed in parallel spaced relation with respect to one side and at the center of gravity of said structure, another being disposed in parallel spaced relation with respect to the other side and at the center of gravity of said structure, another being disposed above the top and in proximity to the tail of said structure, and the others being disposed in parallel spaced relation with respect to the sides of said structure and rearwardly of the center of gravity of the latter.

2. An aircraft including a body structure, revoluble sets of combined elevating and sustaining vanes disposed throughout the top of said structure in spaced relation, and a series of propeller elements, one being disposed in parallel spaced relation with respect to one side and at the center of gravity of said structure, another being disposed in parallel spaced relation with respect to the other side and at the center of gravity of said structure, another being disposed above the top and in proximity to the tail of said structure, and the others being disposed in parallel spaced relation with respect to the sides of said structure and rearwardly of the center of gravity of the latter, said sets being arranged substantially in a tandemwise row, one of the intermediate sets of said row being arranged at a greater elevation than the remaining sets of said row, the said remaining sets being arranged out of alignment with respect to each other.

3. An aircraft including a body structure, revoluble sets of combined elevating and sustaining vanes disposed throughout the top of said structure in spaced relation, and a series of propeller elements, one being disposed in parallel spaced relation with respect to one side and at the center of gravity of said structure, another being disposed in parallel spaced relation with respect to the other side and at the center of gravity of said structure, another being disposed above the top and in proximity to the tail of said structure, the others being disposed in parallel spaced relation with respect to the sides of said structure and rearwardly of the center of gravity of the latter, said structure including a hull, and revoluble sets of combined elevating and sustaining vanes suspended from the hull and arranged in spaced relation.

4. An aircraft including a body structure, revoluble sets of combined elevating and sustaining vanes disposed throughout the top of said structure in spaced relation, and a series of propeller elements, one being disposed in parallel spaced relation with respect to one side and at the center of gravity of said structure, another being disposed in parallel spaced relation with respect to the other side and at the center of gravity of said structure, another being disposed above the top and in proximity to the tail of said structure, and the others being disposed in parallel spaced relation with respect to the sides of said structure and rearwardly of the center of gravity of the latter, said sets being arranged substantially in a tandemwise row, one of the intermediate sets of said row being arranged at a greater elevation than the remaining sets of said row, the said remaining sets being arranged out of alignment with respect to each other, said structure including a hull, and revoluble sets of combined elevating and sustaining vanes suspended from the hull and arranged in spaced relation.

5. An aircraft including a body structure, revoluble sets of combined elevating and sustaining vanes disposed throughout the top of said structure in spaced relation, and a series of propeller elements, one being disposed in parallel spaced relation with respect to one side and at the center of gravity of said structure, another being disposed in parallel spaced relation with respect to the other side and at the center of gravity of said structure, another being disposed above the top and in proximity to the tail of said structure, and the others being disposed in parallel spaced relation with respect to the sides of said structure and rearwardly of the center of gravity of the latter, said sets being arranged substantially in a tandemwise row, one of the intermediate sets of said row being arranged at a greater elevation than the remaining sets of said row, the said remaining sets being arranged out of alignment with respect to each other, said structure including a hull, revoluble sets of combined elevating and sustaining vanes suspended from the hull and arranged in spaced relation, and said sets suspended from said hull being arranged substantially in a tandemwise row.

6. An aircraft including a body structure, revoluble sets of combined elevating and sustaining vanes disposed throughout the top of said structure in spaced relation, and a series of propeller elements, one being disposed in parallel spaced relation with respect to one side and at the center of gravity of said structure, another being disposed in parallel spaced relation with respect to the other side and at the center of gravity of said structure, another being disposed above the top and in proximity to the tail of said structure, and the others being disposed in parallel spaced relation with respect to the sides of said structure and rearwardly of the center of gravity of the latter, the vanes of each set being arranged in pairs, the vanes of each pair extending upwardly at opposite inclinations from their inner ends and having rounded tips, and each of said vanes including a pivot at its inner end disposed at a point between the longitudinal median and one side edge thereof.

7. An aircraft including a body structure, revoluble sets of combined elevating and sustaining vanes disposed throughout the top of said structure in spaced relation, and a series of propeller elements, one being disposed in parallel spaced relation with respect to one side and at the center of gravity of said structure, another being disposed in parallel spaced relation with repect to the other side and at the center of gravity of said structure, another being disposed above the top and in proximity to the tail of said structure, and the others being disposed in parallel spaced relation with respect to the sides of said structure and rearwardly of the center of gravity of the latter, said sets being arranged substantially in a tandemwise row, one of the intermediate sets of said row being arranged at a greater elevation than the remaining sets of said row, the said remaining sets being arranged out of alignment with respect to each other, the vanes of each set being arranged in pairs, the vanes of each pair extending upwardly at opposite inclinations from their inner ends and having rounded tips, and each of said vanes including a pivot at its inner end disposed at a point between the longitudinal median and one side edge thereof.

8. An aircraft including a body structure, revoluble sets of combined elevating and sustaining vanes disposed throughout the top of said structure in spaced relation, and a series of propeller elements, one being disposed in parallel spaced relation with respect to one side and at the center of gravity of said structure, another being disposed in parallel spaced relation with respect to the other side and at the center of gravity of said structure, another being disposed above the top and in proximity to the tail of said structure, and the others being disposed in parallel spaced relation with respect to the sides of said structure and rearwardly of the center of gravity of the latter, said structure including a hull, revoluble sets of combined elevating and sustaining vanes suspended from the hull and arranged in spaced relation, the vanes of each set being arranged in pairs, the vanes of each pair extending upwardly at opposite inclinations from their inner ends and having rounded tips, and each of said vanes including a pivot at its inner end disposed at a point between the longitudinal median and one side edge thereof.

9. An aircraft including a body structure, revoluble sets of combined elevating and sustaining vanes disposed throughout the top of said structure in spaced relation, and a series of propeller elements, one being disposed in parallel spaced relation with respect to one side and at the center of gravity of said structure, another being disposed in parallel spaced relation with respect to the other side and at the center of gravity of said structure, another being disposed above the top and in proximity to the tail of said structure, and the others being disposed in parallel spaced relation with respect to the sides of said structure and rearwardly of the center of gravity of the latter, said sets being arranged substantially in a tandemwise row, one of the intermediate sets of said row being arranged at a greater elevation than the remaining sets of said row, the said remaining sets being arranged out of alignment with respect to each other, said structure including a hull, revoluble sets of combined elevating and sustaining vanes suspended from the hull and arranged in spaced relation, the vanes of each set being arranged in pairs, the vanes of each pair extending upwardly at opposite inclinations from their inner ends and having rounded tips, and each of said vanes including a pivot at its inner end disposed at a point between the longitudinal median and one side edge thereof.

10. An aircraft comprising a fuselage of a contour to provide an airfoil, propelling means disposed on each side of the fuselage at the center of gravity of the latter, propelling means disposed on each side of the fuselage in proximity to the tail of the latter, and propelling means disposed on the top of the fuselage in proximity to the tail of the latter.

11. An aircraft comprising a fuselage of a contour to provide an airfoil, propelling means supported from and opposing the forward part of each side of the fuselage, propelling means supported from, and opposing each side of the fuselage in proximity to the tail of the latter, and propelling means disposed on the top of the fuselage in proximity to the tail of the latter.

12. An aircraft comprising a fuselage of a contour to provide an airfoil, propelling means disposed on each side of the fuselage at the center of gravity of the latter, propelling means disposed on each side of the fuselage in proximity to the tail of the latter, and propelling means disposed on the top of the fuselage in proximity to the tail of the latter, and sets of revoluble spaced elevating and sustaining structures connected to and spaced above the top of the fuselage.

13. An aircraft comprising a fuselage of a contour to provide an airfoil, propelling means supported from and opposing the forward part of each side of the fuselage, propelling means supported from, and opposing each side of the fuselage in proximity to the tail of the latter, propelling means disposed on the top of the fuselage in proximity to the tail of the latter, and sets of revoluble spaced elevating and sustaining structures connected to and spaced above the top of the fuselage.

14. An aircraft including a body structure, revoluble sets of combined elevating and sustaining vanes disposed throughout the top of said structure in spaced relation, and a series of propeller elements, one being disposed in parallel spaced relation with respect to one side and at the center of gravity of said structure, another being disposed in parallel spaced relation with respect to the other side and at the center of gravity of said structure, another being disposed above the top and in proximity to the tail of said structure, and the others being disposed in parallel spaced relation with respect to the sides of said structure and rearwardly of the center of gravity of the latter, said sets being arranged substantially in a tandemwise row, one of the intermediate sets of said row being arranged at a greater elevation than the remaining sets of said row, the said remaining sets being arranged out of alignment with respect to each other, said structure including a hull, revoluble sets of combined elevating and sustaining vanes suspended from the hull and arranged in spaced relation, said sets suspended from said hull being arranged substantially in a tandemwise row, the vanes of each set being arranged in pairs, the vanes of each pair extending upwardly at opposite inclinations from their inner ends and having rounded tips, and each of said vanes including a pivot at its inner end disposed at a point between the longitudinal median and one side edge thereof.

ERVIN E. JOY.